(12) United States Patent
Chan

(10) Patent No.: US 10,564,732 B1
(45) Date of Patent: Feb. 18, 2020

(54) METHOD OF PROVIDING VIRTUAL FUNCTION KEYS BASED ON AN APPLICATION

(71) Applicant: KYE SYSTEMS CORP., New Taipei (TW)

(72) Inventor: Chi-Wai Chan, New Taipei (TW)

(73) Assignee: KYE SYSTEMS CORP., New Taipei (TW)

( * ) Notice: Subject to any disclaimer, the term of this patent is extended or adjusted under 35 U.S.C. 154(b) by 0 days.

(21) Appl. No.: 16/169,858

(22) Filed: Oct. 24, 2018

(51) Int. Cl.
  *G06F 3/02* (2006.01)
  *G06F 3/023* (2006.01)
  *G06F 3/0489* (2013.01)

(52) U.S. Cl.
  CPC ........ *G06F 3/0238* (2013.01); *G06F 3/04895* (2013.01)

(58) Field of Classification Search
  CPC .......... G06F 3/02; G06F 3/0202; G06F 3/023; G06F 3/0238; G06F 3/0489; G06F 3/04895; H01H 13/70; H01H 13/7065
  See application file for complete search history.

(56) References Cited

U.S. PATENT DOCUMENTS

| | | | | |
|---|---|---|---|---|
| 5,105,381 A * | 4/1992 | Takahashi | ............. | G06F 17/274 715/210 |
| 5,867,729 A * | 2/1999 | Swonk | .................... | G06F 3/023 345/172 |
| 5,898,861 A * | 4/1999 | Emerson | .................. | G06F 3/038 703/23 |
| 2002/0063691 A1* | 5/2002 | Rogers | .................. | G06F 3/0219 345/168 |
| 2003/0189551 A1* | 10/2003 | Olsen | ..................... | G06F 3/0238 345/168 |
| 2004/0104893 A1* | 6/2004 | Huang | .................. | G06F 3/0219 345/168 |
| 2005/0022165 A1* | 1/2005 | Ruff | ....................... | G06F 9/4403 717/121 |
| 2005/0288064 A1* | 12/2005 | Lin | ........................ | G06F 3/0238 455/564 |
| 2009/0089394 A1* | 4/2009 | Krueger | .................. | G06F 15/16 709/216 |
| 2010/0194692 A1* | 8/2010 | Orr | ........................ | G06F 3/0414 345/173 |
| 2011/0084904 A1* | 4/2011 | Tan | ....................... | G06F 3/0238 345/163 |

(Continued)

*Primary Examiner* — Joe H Cheng
(74) *Attorney, Agent, or Firm* — Maschoff Brennan

(57) ABSTRACT

A method for providing a virtual function key based on an application includes: after the host obtains the call signal, detecting the currently running application, and the host obtains the function key configuration file according to the detected application, and after obtaining the function key configuration file, according to the content of the function key configuration file, the host displaying a status window on the display device, the status window comprising a plurality of function key labels and a plurality of operation items respectively corresponding to the function key labels, then the host detecting the trigger signal generated when one of the function key labels is selected or the corresponding function key is triggered, and the host searches for the function key configuration file according to the trigger signal and the selected operation item or function key label to obtain the custom key code combination.

7 Claims, 4 Drawing Sheets

(56) References Cited

U.S. PATENT DOCUMENTS

| | | | |
|---|---|---|---|
| 2011/0149341 A1* | 6/2011 | Ko | G06F 3/1204 358/1.15 |
| 2011/0151852 A1* | 6/2011 | Olincy | H04M 1/72552 455/418 |
| 2012/0176302 A1* | 7/2012 | Mangoubi | G06F 3/015 345/156 |
| 2018/0024646 A1* | 1/2018 | Chan | G06F 3/0227 345/172 |

* cited by examiner

METHOD OF PROVIDING VIRTUAL FUNCTION KEYS BASED ON AN APPLICATION

BACKGROUND

Technical Field

The present disclosure relates to a method of providing virtual function keys on a display device, and more particularly to a method for providing a virtual function keys corresponding to a foreground application.

Related Art

As the computing speed of the computer increase, users can execute more applications at the same time. In order to switch or operate smoothly between multiple applications, it is common to switch or operate the application by a keyboard. Generally, the keyboard includes a typing key area, a specific function area, a numeric keypad, and an editing keypad; wherein the functions such as renaming, searching, rearranging, etc. provided by function keys (Function Key, F1 key to F12 key) located in the specific function area have been printed on the key cap. However, in order to meet the needs of different users for quick operation of the application, the user prefers to be able to customize or expand the quick operation items represented by the function keys. There are also a variety of software available on the market for users to define their own function keys for quick operation.

As the number of applications such as office software, drawing software, web browsers, games, etc. that users execute at the same time increases, the limited number of function keys set a limit to the number of the new functions that can be added, which in turn causes users have to remember which applications correspond to which quick keys. Once a new application is installed, the user may have to switch to the application and be forced to modify the previously set script file. Repeating the button setting and reloading one of the multiple script files that have been set up undoubtedly bring a lot of inconvenience and trouble to the user. Furthermore, when the user need to execute an application, because the user has had a certain period of time since the last operation, the user may easily forget the operation item corresponding to the function key that was originally set, and cannot enjoy the benefits of changing button function to provide quick start or input instructions.

Although in some commercially available software, a function bar can be displayed on the screen to give the user hints for the previously set function keys and their corresponding operation items, this type of function bar can only display the contents in a set of function key configuration files. When the user frequently switches the currently operated application, the items displayed on the function bar must still be updated by reloading. In addition, the common function bars of nowadays often can only give hints, and cannot be operated directly by the user's mouse to execute the operation items designated by the function keys. Therefore, the user's sight must therefore be switched back and forth between the application, the function bar and the physical keyboard, so as to correctly press the desired function key on the keyboard. Thus, said software cannot meet the fast and accurate requirements in application operation.

SUMMARY

In view of this, the present disclosure proposes a method for providing virtual function keys based on an application, thereby solving the inconvenience of the conventional function bar.

A method for providing a virtual function key based on an application according to an embodiment of the present disclosure is applicable to a host that electrically connects a keyboard and a display device, and the method includes: after the host obtains the call signal, detecting the current operating application, wherein the application is in a foreground window; the host obtains a function key configuration file according to the detected application; after obtaining the function key configuration file, the host presents a status window on the display device according to the content of the function key configuration file. The status window includes a plurality of function key labels and a plurality of operation items respectively corresponding to the function key labels, and the function key labels respectively represent a plurality of function keys on the keyboard; the host detects the trigger signal and triggers the signal system. When the operation item or the function key label on the status window is selected, or when the user presses and triggers the designated function key; and the host searches in the function key configuration file to obtain a custom key combination according to the trigger signal and the selected operation item or the function key label.

In summary, the method for providing a virtual function key based on an application in the present disclosure achieves the following functions by an embedded program running in the background of the operating system for the user to view the setting content of the function key configuration file. Save multiple sets of customized function key configuration files, and automatically detect the corresponding function key hints provided by the current application. The user only needs to make a one-time setting, and then the embedded program provides an automatic detection and switching mechanism. In addition to retaining the original intention of pressing the trigger function key to quickly execute a complicated operation item, the user can click on a default or custom virtual function key on the screen to execute an operation item assigned to the function key. The process is fast, accurate, and a user-friendly way to get started.

The above description of the disclosure and the following description of the embodiments of the present disclosure are intended to illustrate and explain the spirit and principles of the invention, and can give a further explain of the present disclosure.

BRIEF DESCRIPTION OF THE DRAWINGS

The present disclosure will become more fully understood from the detailed description given here in below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The method for providing virtual function keys based on an application according to an embodiment of the present disclosure is implemented by an embedded program running on a host, a display device electrically connected to the host, and a designated keyboard. The embedded program is, for example, a driver that has been built in the computer or an application software that needs to be installed initially. The installation method is, for example, installation via a CD, and USB OTG (on-the-go) through the keyboard, download and install from the original website, or download and install in the form of APP (application). The display device, such as a screen or a touch screen, is not limited in the present disclosure. The specified keyboard will be described in detail later when the process of detecting the keyboard is described.

Figure 1:
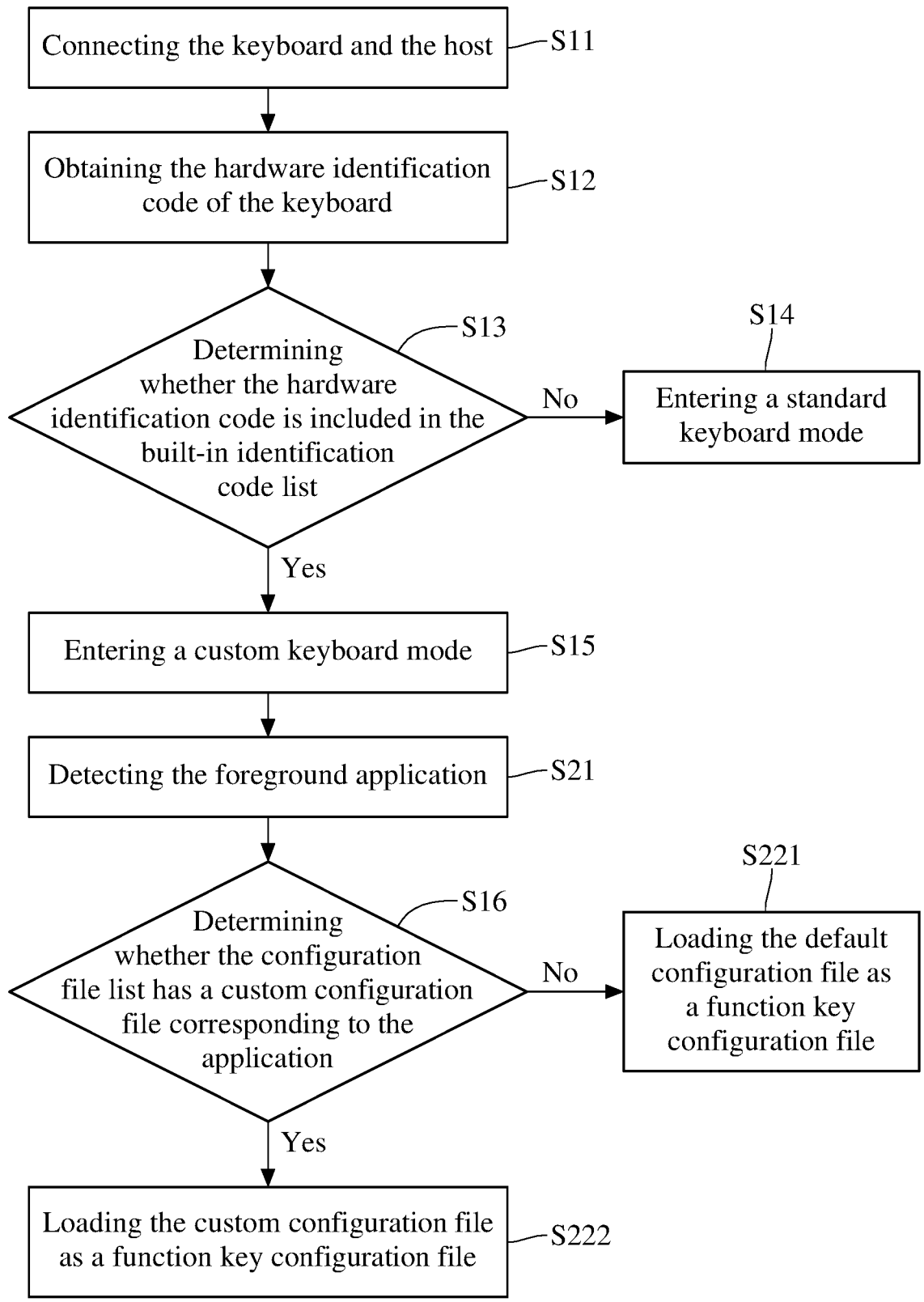
FIG. 1 is a flow chart of a detecting a keyboard according to an embodiment of the disclosure.

Please refer to FIG. 1, which is a flow chart of detecting a keyboard according to an embodiment of the disclosure. First, please refer to step S11, connecting the keyboard and the host. In detail, the user electrically connects the general keyboard or the designated keyboard to the computer wirelessly or by wire. After the computer is turned on, the startup mechanism of the embedded program can be automatic or manual. The former is activated by an embedded program that is launched when the work system is loaded. The latter is activated by a user pressing a specific button on the keyboard (for example, a single button on a designated keyboard or a combination of a plurality of buttons on a general keyboard) or through clicking an icon by the mouse to execute the embedded program. In addition, when the embedded program is executed, the user can change it to disable (do not execute) at any time, or further uninstall the embedded program.

Please refer to step S12, obtaining the hardware identification code of the keyboard. In detail, after the keyboard is connected to the host, the embedded program already running in the operating system automatically detects the hardware identification code of the keyboard. The hardware identification code includes a product ID (PID) and a vendor ID (VID).

Referring to step S13, the embedded program determines whether the hardware identification code is included in the built-in identification code list. In other words, the embedded program confirms whether or not the currently connected keyboard model is supported. In practice, in addition to automatically checking the list of identifiers stored by the embedded program, the user can also select the keyboard model that is electrically connected to the host in the list. Later, when the user purchases an additional new keyboard and connects to the host, the new keyboard can be supported by updating the embedded program.

Please refer to step S14 and step S15 together. If it is confirmed in step S13 that the hardware identification code of the keyboard connected to the host is not present in the identification code list built in the embedded program, the keyboard is regarded as a general standard keyboard, and the embedded program enters a standard keyboard mode as shown in step S14, that is, the embedded program loads the configuration file of the commercially available standard keyboard. Conversely, if the hardware identification code of the keyboard currently connected to the host is found from the identification code list in step S13, the keyboard is regarded as a designated keyboard, which supports the subsequent operation of the embedded program. Thus, as shown in step S15, the embedded program enters the custom keyboard mode.

Please refer to step S21, detecting the foreground application. In detail, the foreground application is an application that is operated by a user in an operating system running after the computer is powered on, and the application is in a foreground window due to user operations. Generally, the operating system (OS) are usually Microsoft's Windows or Apple's Mac OS; however, the type of operating system is not limited to the above. It is additionally noted that after the process of step S13 to step S15 is completed, that is, the embedded program confirms that the hardware identification code of the keyboard currently connected to the host has a list of identification codes, the detection of the foreground application can be started. This means that the embedded program will perform foreground application detection and its subsequent steps only if the specified keyboard supported by the embedded program is connected to the host.

Referring to step S16, it is determined whether the configuration file list has a custom configuration file, corresponding to the application detected in step S21. Specifically, in the flow of steps S13 to S15, the embedded program has confirmed that the hardware identification code of the keyboard exists in the identification code list. Next, in step S21, the embedded program confirms the foreground application. Then in step S16, the embedded program searches in the list of configuration files corresponding to the hardware identification code according to the detected application. In practice, a plurality of configuration file lists can be stored in the embedded program, and different configuration file lists correspond to keyboards of different models. Each profile list includes at least one configuration file, while one of which is a default configuration file of the original factory and the rest is a custom configuration file. The custom profile is, for example, a profile set by the user through the embedded program. The preset configuration file is, for example, a pre-configured (or pre-updated) configuration file in the embedded program, or a configuration file downloaded by the user from the original website. It must be emphasized that each custom profile corresponds to an application that can run on the same computer host, and the default profile can also correspond to an application as a custom profile, or is common to all applications. The application may include a communication software such as Skype, Word, Excel, etc., or a multimedia playback software such as a Potplayer, etc., and the present disclosure does not limit the type of the application.

Please refer to step S221 and step S222 together. If the embedded program confirms that there is only one preset configuration file in the configuration file list without any custom configuration file in step S16, the embedded program loads the preset configuration file as a function key configuration file as described in step S221. Otherwise, as described in step S222, the embedded program loads the custom profile as a function key profile.

The function key configuration file stores a plurality of operation items corresponding to a plurality of function keys. For example, the function key configuration file corresponding to the document application "Word" has operation items such as "shrinking font size of selected texts" and "growing font size of selected texts"; and the function key configuration file corresponding to the multimedia play application "Potplayer" has "playing the previous song", "pause" and other functions. Therefore, when the embedded program detects that the foreground application is "Word" in step S21, and finds a custom profile corresponding to the application "Word" in the profile list in step S16, what the function key configuration file loads in step S21 includes the functions of "shrinking font size of selected texts" and "growing font size of selected texts". Similarly, when the current application is a "Potplayer", the loaded configuration file includes the functions of "playing the previous song" and "pause".

Figure 2:
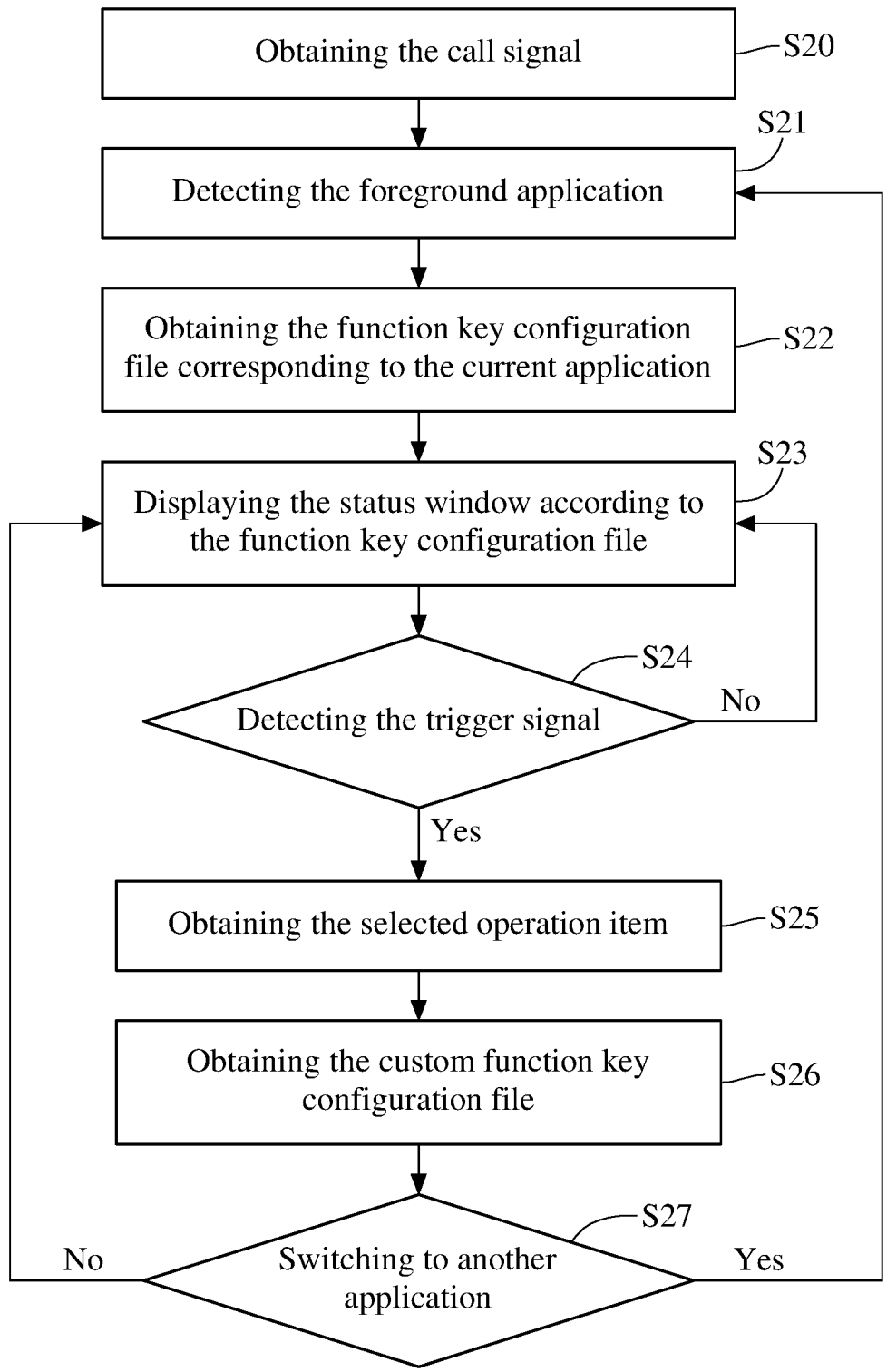
FIG. 2 is a flow chart of providing virtual function keys according to an embodiment of the disclosure.

Please continue to refer to FIG. 2, which is a flow chart showing the process of providing virtual function keys in an embodiment of the present disclosure. Please refer to step S20, obtaining a call signal. The call signal is used to execute the status window described in step S23. In practice, the status window may appear automatically as the embedded program is launched, or may be manually initiated by the user. The method of sending the calling signal is, for example, a button combination formed by the user pressing a button dedicated to the sending of the calling signal on the designated keyboard, or press a single start button or a plurality of buttons separately set by the user. In addition, the user can also click by the mouse to send a call signal. The present disclosure does not limit the way of sending the call signal.

Please refer to step S21, detecting the foreground application. This step is equivalent to step S21 of FIG. 1 and will not be described again here.

The status window 20 can be simultaneously displayed on the display device 10 as the embedded program is started, or can be presented on the display device 10 after detecting a call signal sent by the user. For the method of sending the call signal, please refer to the description of step S20. Please continue to refer to FIG. 3, in the status window 20, each function key on the keyboard can be presented in the form of a text, an icon or a logo according to the currently loaded function key configuration file. A label and a specified operation item corresponding to each function key. The display field in the status window depends on the number of function keys set in the function key configuration file, and there is no limit on the number of fields, so the function key referred to in the present disclosure can be any designated key on the keyboard or the key combination formed by a plurality of keys. This disclosure describes the function key as the F1 to F12 keys, but is not limited thereto. By the design of the state window 20, the effect of giving the user hints can be achieved. In another embodiment of the present disclosure, after the status window 20 is presented on the display device 10 for more than a predetermined display time, or when the user receives the call signal sent again during the embedded program presentation status window 20, or if the user directly clicks "close" on the status window 20, the status window 20 can be removed from the screen to reduce interference with the user.

Figure 3:
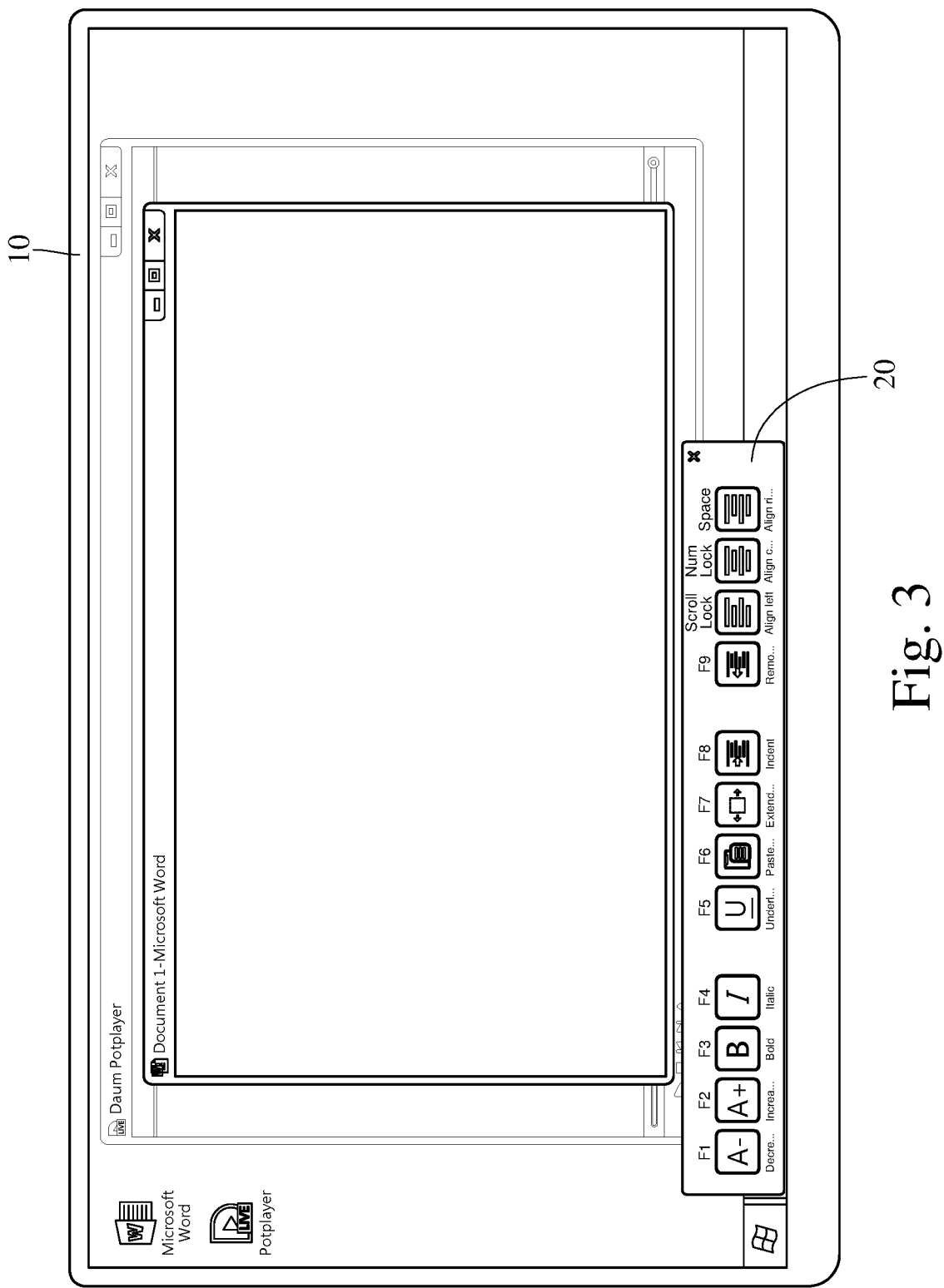
FIG. 3 is a schematic diagram of a state window according to an embodiment of the disclosure.

Please refer to step S23, according to the function key configuration file presentation status window, and please refer to FIG. 3 at the same time. In particular, the embedded program presents a status panel 20 on a display device 10 (e.g. a screen) that is electrically connected to the host. The status window 20 includes a plurality of function key labels and a plurality of operation items respectively corresponding to the function key labels, and each of the function key labels represents a plurality of function keys electrically connected to the keyboard of the host. The function keys of the present disclosure may be any combination of a designated key or a plurality of keys on the keyboard, including but not limited to from the F1 key to the F12 key, namely, the function key is constituted by an assigned button or the combination of a plurality of buttons of the keyboard. In short, the status window 20 presents a function key area of a virtual keyboard and an operation item description (including an image and a text) represented by each function key for the user to view. For example, in FIG. 3, the function key identifiers include F1~F9 and Scroll Lock, Numlock, and Space keys, and the rest are not described again; the operation item is a corresponding icon below the function key label. For example, the operation item corresponding to the F1 key is shrinking font size of selected texts. The operation item corresponding to the F2 key is growing font size of selected texts, and the operation item corresponding to the F3 key is a bold type text . . . etc. These operation items are defined in the function key configuration file. The user can also modify one or more custom configuration files stored in the host computer through the editing function provided by the embedded program at any time, or download the updated default profile from the official website of the keyboard factory.

Please refer to step S24 and step S25 together. In step S24, the embedded program detects the trigger signal. In practice, in addition to the user directly pressing the designated function key on the trigger keyboard, the user can also click on any function key mark or action item to generate a trigger signal in the status window 20 through the mouse, trackball or touch pad. When the display device 10 is a touch screen, the touch signal can be generated by clicking through the stylus or the user's finger. Once the embedded program confirms that the trigger signal is generated corresponding to the coordinate on the display screen is indeed located in a certain function key label or an icon located in an operation item, then the process goes to step S25 to obtain the selected function key label or operation item. Otherwise, returning to step S23, the status window 20 continues to be displayed.

Please refer to step S26, obtaining a custom key combination. In detail, according to step S25, the embedded program searches in the selected function key label or the function key configuration file corresponding to the current application obtained by the operation item in step S22 to see whether there is a matching one, to obtain the selected function key mark or the custom key code combination corresponding to the operation item. The embedded program then sends this custom key combination back into the operating system to perform the content of the action item selected by the user. The custom key combination is the control signal corresponding to the function key or the operation item that is pressed in step S24. Operating items include, but are not limited to, shortcuts, applications, or hyperlinks, or for outputting images, strings, commands, macros, single-button signals, or composite button signals.

Please refer to step S27, determining whether the detected application is switched to another application. In detail, after the step S26 is completed, the embedded program checks whether the foreground window at this time has been switched by the user. If yes, return to step S21 to re-detect the application currently in the foreground window, and then proceed according to the foregoing steps S21 to S26. Conversely, if the user does not switch the currently operating application, the process returns to step S24, and the embedded program waits for the next trigger signal, and then proceeds according to the foregoing steps S24 to S26.

Figure 4:
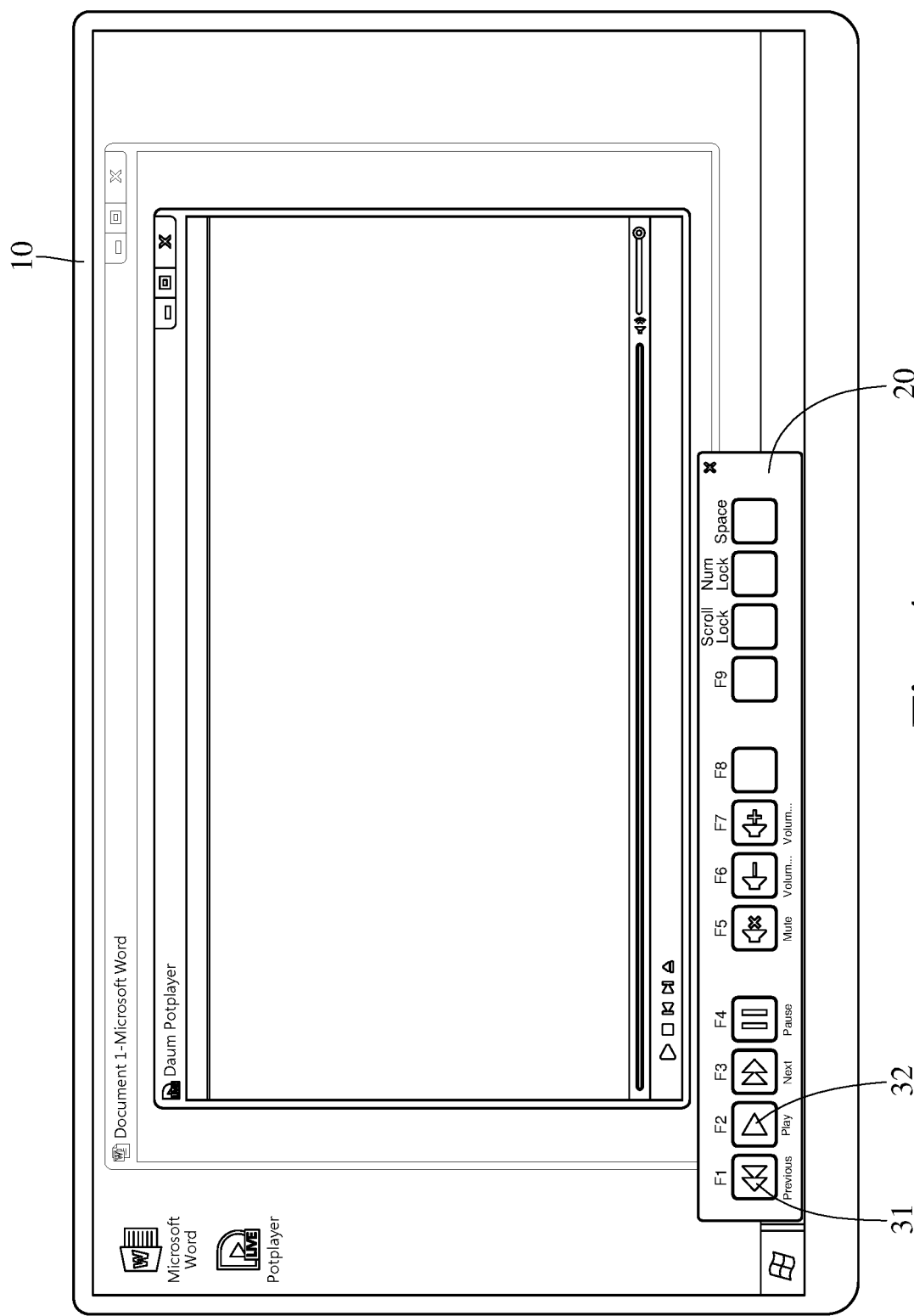
FIG. 4 is a schematic diagram of another state window according to an embodiment of the disclosure.

Please refer to FIG. 3 and FIG. 4, which are schematic diagrams showing two state window of the present disclosure. In FIG. 3, the foreground application is "Word" and the background application is "Potplayer", so the status window 20 presents the function key configuration file for "Word". In FIG. 4, the foreground application is "Potplayer" and the background application is "Word", so the status window 20 presents a function key configuration file for "Potplayer".

Please continue to refer to FIG. 3. The embedded program detects that the foreground application is "Word" in step S21. Therefore, the function key configuration file corresponding to "Word" is obtained in step S21, and the status window 20 is presented on the screen, and the function key label and its corresponding operation item are given in a hint that the function keys currently available to users who operate "Word". The embedded program waits for the trigger signal of the user in step S24. When the user triggers the function key label of the F1 key in step S25, the embedded program will search for the function key configuration file in step S26 to obtain the custom key code combination corresponding to the F1 key, and transmit the custom key code combination to "Word". In order to achieve the operation of reducing the selected text, if it is confirmed in step S26 that the user has not switched away from "Word", the effect of growing font size of selected texts can be achieved after the user triggers the function key label of the F2 key, or the function key label of the Scroll Lock key is triggered to achieve the left-aligned features for the selected text. As mentioned above, please refer to FIG. 4. If the user switches to the "Potplayer" in step S26, when the user triggers the icon 31 of the operation item corresponding to the F1 key, the function of switch back to the previous song can be reached; when the operation item icon 32 corresponding to the F2 key is triggered, the function of playing the current song is reached. As can be seen from the illustrative examples of FIG. 3 and FIG. 4, in the case where the foreground application is different, the user can trigger the same function key F1 to reach different quick operation items, and the user can easily be in the status window 20. To know all the available function keys and their corresponding operation items (for example, in the "Potplayer" application shown in FIG. 4, there is no corresponding operation item from F8 key to F12 key, which means that pressing F8 key to F12 key means there will be no action) saves the time that the user has to go through the cumbersome steps to achieve the same function. In addition, each time the user switches the foreground application, the status window 20 updates the presented item according to the current application and its corresponding function key configuration file, thereby saving the user from the time of has to reload the function key configuration file when switching between different applications.

In summary, the method for providing virtual function keys based on the application of the present disclosure can detect the keyboard currently connected to the host through the embedded program. After confirming that the model of the keyboard is supported, the function key configuration file corresponding to the keyboard model and the foreground application is loaded according to the foreground application that the current user is operating. And when the user sends a call signal, a status window is presented on the display device, which includes all available function key labels and corresponding operation item icons. In addition to the user being able to directly press the designated function key on the trigger keyboard, the user can click the function key icon or the operation item icon presented in the status window, and the embedded program automatically triggers the function key labels or the operation item sent in the combination of the custom key code corresponding to the function key configuration file, to execute the operation item selected by the user. The status window can automatically update the content presented on the display device in response to different applications. In general, the method for providing a virtual function key based on an application according to the present disclosure can provide a user a quick operation without using the keyboard, and give users a smoother operating experience, according to a keyboard model, or according to an operating application.

What is claimed is:

1. A method for providing a virtual function key based on an application, adapted for a host electrically connecting with a keyboard and a display device, the method comprising:
   detecting a currently running applications after the host obtains a call signal, wherein the application is operated via a foreground window;
   obtaining a function key configuration file by the host according to the detected application;
   presenting a status window on the display device by the host according to the content of the function key configuration file after obtaining the function key configuration file, wherein the status window includes a plurality of function key labels and a plurality of operation items, wherein the plurality of operation items corresponds to the function key labels respectively, and the function key labels each represents a function key in a plurality of function keys on the keyboard;
   detecting a trigger signal generated by the host when one of the operation items or one of the function key labels is selected or a corresponding function key is triggered; and
   searching for a custom key code combination in the function key configuration file by the host according to the trigger signal and the selected operation item or function key label.

2. The method for providing a virtual function key based on an application according to claim 1, further comprising: pressing a button or a button combination of the keyboard to generate the call signal, wherein the button combination comprises a plurality of buttons.

3. The method for providing a virtual function key based on an application according to claim 1, wherein the custom key code combination is configured to execute a shortcut, an application or a hyperlink, or to output an image, a string, an instruction, a giant set, a single button signal or a composite button signal.

4. The method for providing a virtual function key based on an application according to claim 1, wherein before detecting the currently running application, the method further comprises:
   obtaining a hardware identification code of the keyboard by the host; and
   confirming whether the hardware identification code exists in an identification code list by the host; and
   wherein detecting the currently running application further comprises: detecting the application by the host when the hardware identification code exists in the identification code list.

5. The method for providing a virtual function key based on an application according to claim 4, wherein after detecting the currently running application by the host, the method further comprises:
   confirming a configuration file list corresponding to the hardware identification code by the host; and
   confirming whether the configuration file list includes a custom configuration file corresponding to the application by the host;
   wherein, using the custom configuration file as the function key configuration file when the configuration file list includes the custom configuration file corresponding to the application, and using a preset configuration file in the configuration file list as the function key configuration file when the configuration file list does not include the custom configuration file corresponding to the application.

6. The method for providing a virtual function key based on an application according to claim 4, wherein the hardware identification code comprises a product identification code and a vendor identification code.

7. The method for providing a virtual function key based on an application according to claim 1, wherein the function key is constituted by an assigned button or the combination of a plurality of buttons of the keyboard.

* * * * *